United States Patent
Hargrave et al.

(10) Patent No.: US 9,912,446 B2
(45) Date of Patent: *Mar. 6, 2018

(54) DEVICE, METHOD AND COMPUTER READABLE MEDIUM FOR COMMUNICATION ON A ZIGBEE NETWORK

(71) Applicant: AMX LLC, Richardson, TX (US)

(72) Inventors: James Roger Hargrave, Wylie, TX (US); Kelvin Hui Xu, Plano, TX (US); David Alan Escamilla, Wylie, TX (US)

(73) Assignee: AMX LLC, Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/378,895

(22) Filed: Dec. 14, 2016

(65) Prior Publication Data

US 2017/0093531 A1 Mar. 30, 2017

Related U.S. Application Data

(63) Continuation of application No. 14/960,406, filed on Dec. 6, 2015, now Pat. No. 9,554,242, which is a continuation of application No. 14/325,952, filed on Jul. 8, 2014, now Pat. No. 9,232,344, which is a continuation of application No. 12/075,742, filed on Mar. 13, 2008, now Pat. No. 8,780,917.

(60) Provisional application No. 60/918,392, filed on Mar. 14, 2007.

(51) Int. Cl.
| | |
|---|---|
| G06F 15/173 | (2006.01) |
| H04L 1/08 | (2006.01) |
| H04L 12/66 | (2006.01) |
| H04W 28/06 | (2009.01) |
| H04W 76/02 | (2009.01) |
| H04W 4/00 | (2018.01) |
| H04W 28/10 | (2009.01) |
| H04L 12/863 | (2013.01) |
| H04L 1/12 | (2006.01) |
| H04W 84/18 | (2009.01) |
| H04W 88/16 | (2009.01) |
| H04W 92/02 | (2009.01) |

(52) U.S. Cl.
CPC .............. *H04L 1/08* (2013.01); *H04L 1/12* (2013.01); *H04L 12/66* (2013.01); *H04L 47/625* (2013.01); *H04W 4/008* (2013.01); *H04W 28/06* (2013.01); *H04W 28/10* (2013.01); *H04W 76/02* (2013.01); *H04W 84/18* (2013.01); *H04W 88/16* (2013.01); *H04W 92/02* (2013.01); *Y02B 60/50* (2013.01)

(58) Field of Classification Search
CPC .... H04W 28/02; H04L 1/1887; H04L 1/1841; H04L 47/10; H04L 47/50
See application file for complete search history.

(56) References Cited

U.S. PATENT DOCUMENTS 5,502,733 A * 3/1996 Kishi .................. G06F 11/1443 714/748
2006/0129723 A1* 6/2006 Green .................. H04L 1/1877 710/106

* cited by examiner

*Primary Examiner* — Skukri Taha

(57) ABSTRACT

In a zigbee network, reliable communications are provided by maintaining messages transmitted from a device in a message queue in the device. If no successful acknowledgement is received for a transmitted message, the message is re-transmitted when the message queue executes. Messages are deleted from the queue when the message is successfully transmitted or when a maximum number of re-tries has been exhausted.

20 Claims, 16 Drawing Sheets

DEVICE, METHOD AND COMPUTER READABLE MEDIUM FOR COMMUNICATION ON A ZIGBEE NETWORK

CROSS REFERENCE TO RELATED APPLICATIONS

The present patent application is a continuation of U.S. patent application Ser. No. 14/960,406, filed Dec. 6, 2015, titled "DEVICE, METHOD AND COMPUTER READABLE MEDIUM FOR COMMUNICATION ON A ZIGBEE NETWORK", which is a continuation of U.S. patent application Ser. No. 14/325,952, filed Jul. 8, 2014, titled "DEVICE, METHOD AND COMPUTER READABLE MEDIUM FOR COMMUNICATION ON A ZIGBEE NETWORK", now issued as U.S. Pat. No. 9,232,344 on Jan. 5, 2016, which is a continuation of U.S. patent application Ser. No. 12/075,742, filed Mar. 13, 2008, titled "SYSTEM, METHOD AND COMPUTER READABLE MEDIUM FOR COMMUNICATION ON A ZIGBEE NETWORK", issued as U.S. Pat. No. 8,780,917 on Jul. 15, 2014, which is a non-provisional of and claims the benefit of provisional patent application No. 60/918,392, filed Mar. 14, 2007, titled "METHOD AND SYSTEM FOR ZIGBEE AND ETHERNET GATEWAYS", the entire contents of which are incorporated by reference herein.

FIELD OF THE INVENTION

The present invention relates in general to the field of ZigBee protocols, and, more particularly, the present invention is related to a system, method and computer readable medium for providing enhanced ZigBee related functionality.

BACKGROUND OF THE INVENTION

Zigbee is a suite of protocols, based on the IEEE 802.15.4 standard, designed for a low-data-rate, low-power wireless personal area network ("WPAN"). While ZigBee has a lower data transfer rate than that in other wireless LAN or Bluetooth technologies, it has an advantage such that the power consumption is considerably lower. ZigBee may be used to radio-control everything from light illumination to a home security system.

The IEEE 802.15.4 standard utilizes a 64-bit unique identifying code, known as an extended unique identifier ("EUI"), to uniquely identify each device in the ZigBee network. An EUI is similar to an Ethernet media access control ("MAC") address, which is a unique identifier for a network interface (or a layer of addressing on a network). According to the IEEE 802.15.4 standard, the EUI is exchanged for a 16-bit short address, known in ZigBee as a node ID. Using a node ID allows messages to be reduced by 48 bits, while still supporting addressing of up to 65,535 devices in the ZigBee network. However, a node ID is not guaranteed to be unique within a ZigBee network, which may result in conflicts associated with addressing devices within the ZigBee network.

A typical ZigBee network 200 such as shown in FIG. 11 has one or more nodes arranged in an appropriate network structure. Common Zigbee network structures include, without limitation, a star structure, mesh structure and cluster tree. For the purpose of clarity, the network 200 is illustrated as a tree structure. The parent of all of the nodes in a ZigBee network is known as a ZigBee network coordinator 213. The ZigBee network coordinator 213 is responsible for maintaining the top-level routing tables for the ZigBee network, and for forming the ZigBee network as new devices join. At the end of the network structure 200 are end-devices 212. An end device 212 is a device residing in a ZigBee network that performs useful end-user functions within the ZigBee network. Such devices include remote controls, light switches, light fixtures and the like. Typically, an end device will include a processor 217, memory 214, transmitter 215 and receiver 216. The end devices, such as end device 212a may communicate directly with the network coordinator 210 or may communicate through routers 242. The routers 242 provide additional message routing between the end-devices and the network coordinator, thereby providing an expanded network. A gateway 214 is a device capable of translating between the Zigbee network 200 and a peripheral network 205 and representing devices from one network to the other.

An end device 212 connects to a Zigbee network by scanning a network space for beacons identifying available zigbee networks, as defined in the ZigBee specification and the IEEE 802.15.4 specification. A network connection routine then follows in which the routing tables of the network coordinator 213 are updated with the end device information. The end device 212, now registered on the network, is then able to perform its intended network functions.

There currently exists various limitations associated with ZigBee that are known in the prior art. One such limitation is the accurate transmission of messages from end devices on a zigbee network. As such, what is needed is a system, method, and computer readable medium for providing improved ZigBee related functionality that overcomes these limitations.

SUMMARY OF THE INVENTION

The present invention seeks to provide more accurate communications on a zigbee network by storing transmitted messages in a device for later transmission if the original transmission is unsuccessful. In one embodiment of the disclosure, a method for communicating on a zigbee network comprises transmitting a message from a device; storing the transmitted message in the device; determining whether the message was successfully transmitted; if the message was not successfully transmitted, determining if the message can be re-transmitted; and if the message can be re-transmitted, re-transmitting the message from the device.

In one embodiment of the disclosure, a device for use on a zigbee network comprises at least one transmitter; at least one processor; and at least one memory; wherein the transmitter is configured to transmit at least one message; wherein the memory stores said transmitted message; wherein the processor determines whether the message was transmitted successfully; wherein, if the message was not transmitted successfully, the processor determines if the message can be re-transmitted; and wherein if the message can be re-transmitted, the transmitter re-transmits the message.

In one embodiment of the disclosure a computer readable medium comprises instructions executable on a device of a zigbee network, the instructions for transmitting a message from the device; storing the transmitted message in the device; determining whether the message was successfully transmitted; if the message was not successfully transmitted, determining if the message can be re-transmitted; and if the message can be re-transmitted, re-transmitting the message from the device.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein.

DETAILED DESCRIPTION OF THE PREFERRED EMBODIMENTS

Figure 1:
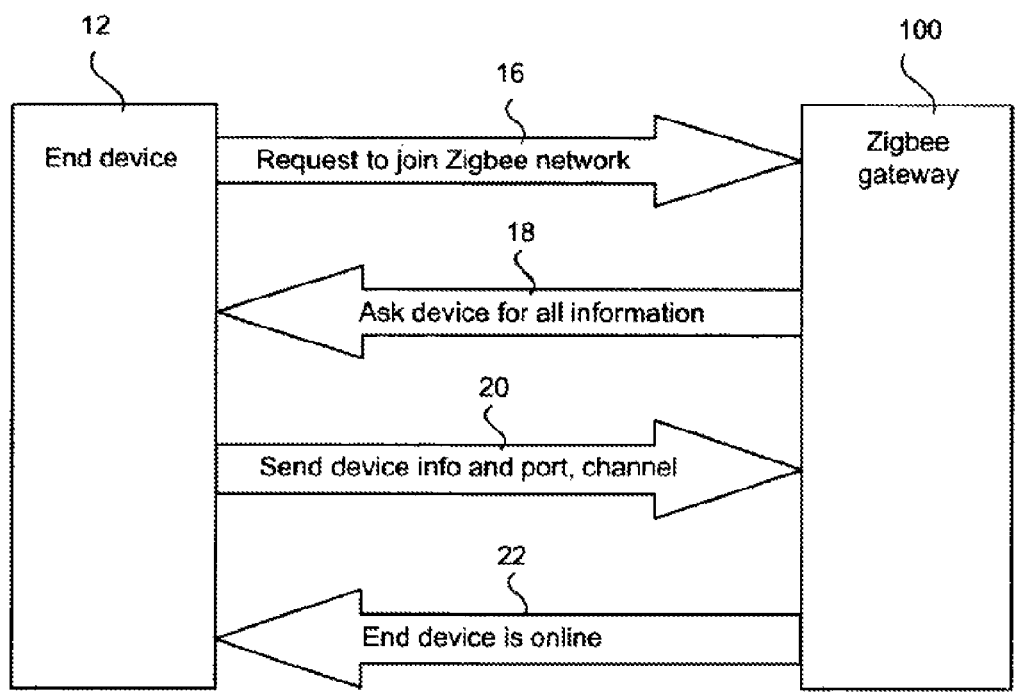
FIG. 1 is a block diagram illustrating an end-device request to join a ZigBee network message flow in accordance with an embodiment of the present invention.

Referring now to the drawings, wherein like reference numerals designate identical or corresponding parts throughout the several views, preferred embodiments of the present invention are described.

Figure 10:
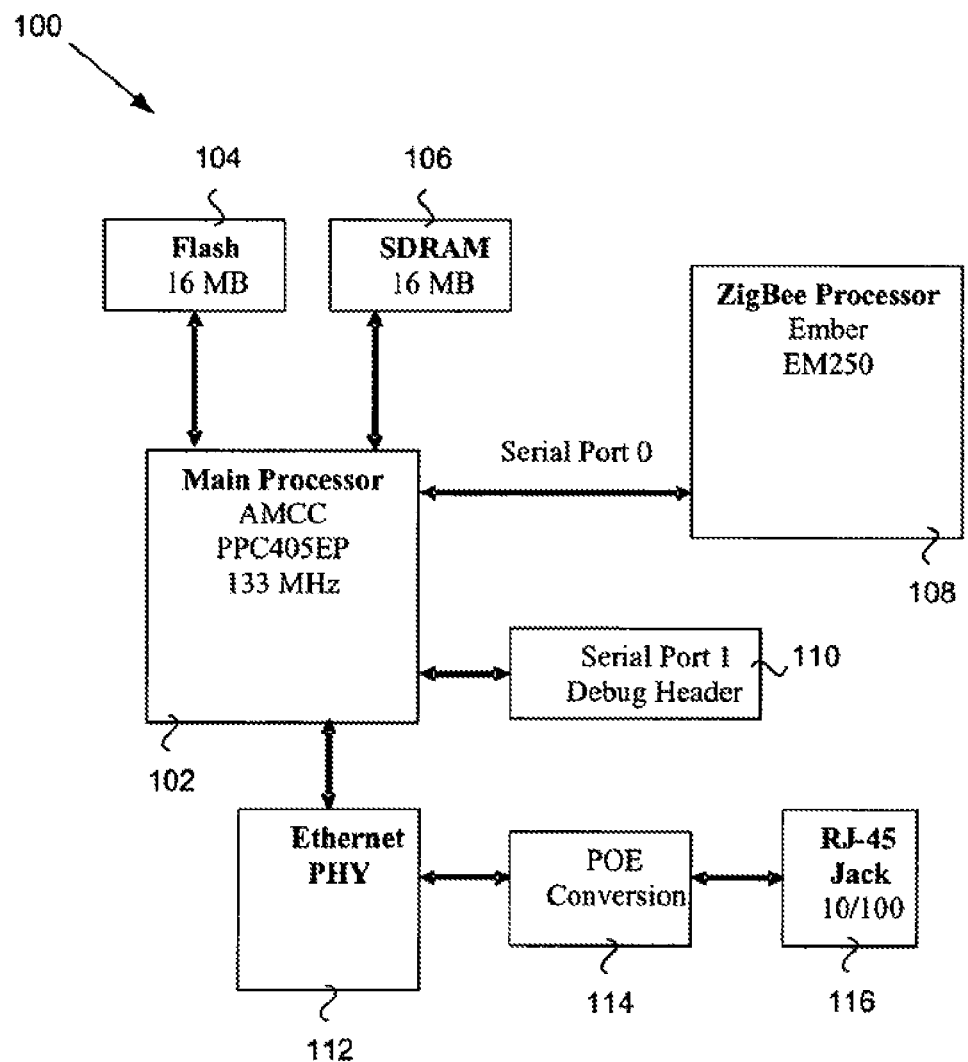
FIG. 10 is a block diagram illustrating a ZigBee gateway in accordance with an embodiment of the present invention.

Referring now to FIG. 10, a block diagram illustrating a ZigBee gateway in accordance with an embodiment of the present invention is shown. The gateway 100 may include, without limitation, a main processor 102 having one or more memory devices 104 and/or 106, a serial port connected to an external processor 108, a serial port debug header 110, and an Ethernet connection 112.

In one possible implementation, the main processor 102 is an AMCC PPC405EP 32-bit PowerPC processor. The 405EP includes an integrated 32-bit wide SDRAM controller, a 32-bit wide PCI bus, a 16-bit wide peripheral bus, two 10/100 Ethernet MACs, 32 general purpose I/Os (GPIOs), two serial ports, and an I2C port. The 405EP is clocked using a 33 MHz SYS_CLOCK. The PPC runs at 133 MHz with a 66 MHz SDRAM bus speed. The 405EP includes 16 Mbyte of external SDRAM 106 and 16 Mbyte of external flash 104. The first MAC is connected to a Micrel KS8721BL 10/100 Ethernet PHY and provides a 10/100 Ethernet port for the gateway 100. A serial port may optionally be connected to a debug header and used as an interface to an operating system monitor. The external processor 108 is an Ember EM25016-bit XAP2b microprocessor that includes on-board RAM and flash memory. The XAP2b microprocessor runs the ZigBee protocol stack and is customized to run propriety commands from AMX LLC. Serial port zero of the XAP2b microprocessor is used to communicate with the ZigBee processor 102. The gateway 100 may be configured to allow ZigBee enabled devices to communicate with an ICSP master. The gateway 100 acts as a gateway to these devices, translating message to and from them.

Figure 11:
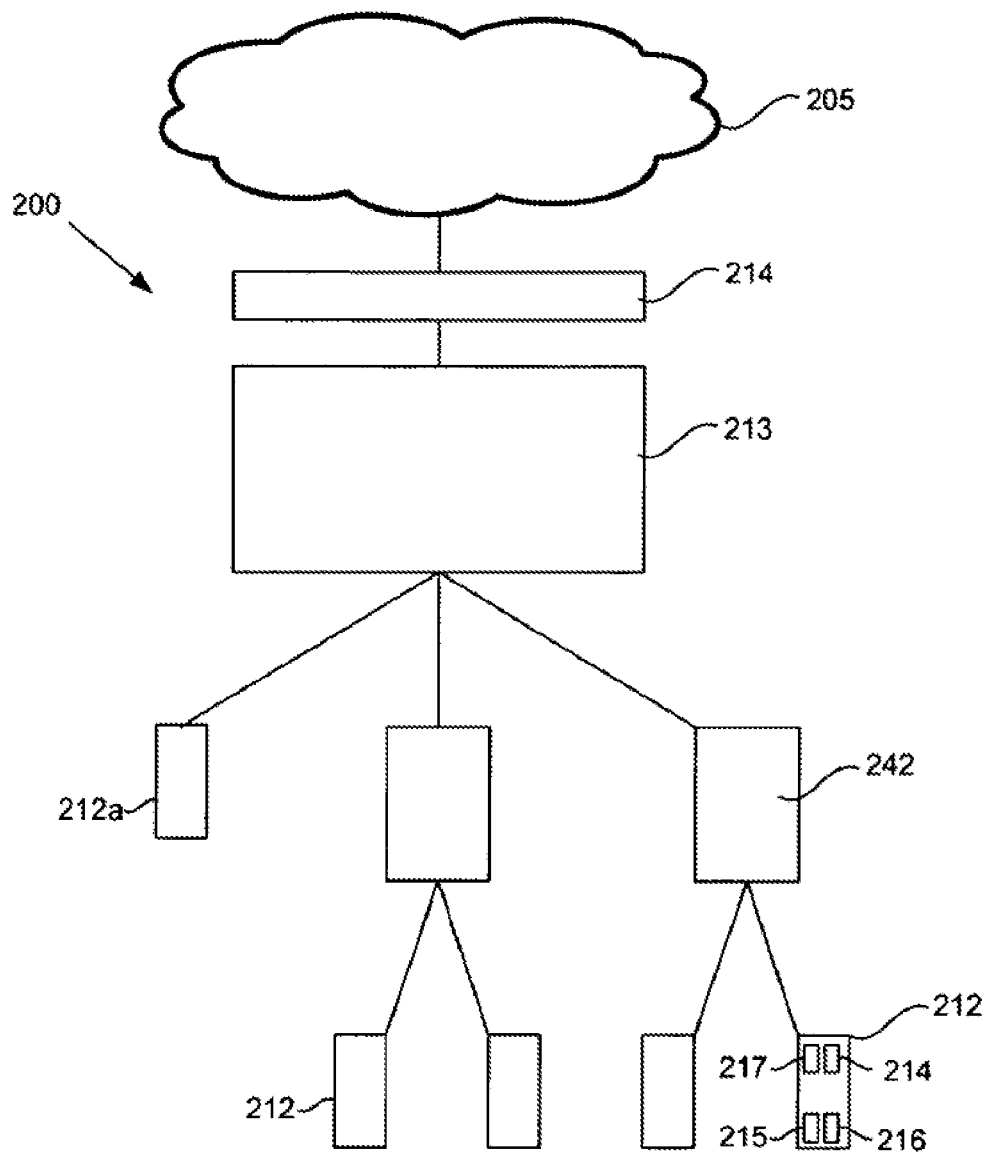
FIG. 11 represents a typical Zigbee network arrangement.

As described above in relation to FIG. 11, a typical Zigbee network provides a network coordinator 213 as the top level device that builds and controls messaging on the network. The network coordinator 213 interfaces with peripheral networks through a gateway 214. In the presently described embodiment, the functions of the network coordinator are provided by the processors and memory of the gateway 100 shown in FIG. 10. That is, the gateway 100 serves the dual roles of network coordinator and gateway. It will be readily understood by the person skilled in the art alternative embodiments are possible. For example, in other embodiments, the network coordinator 12 may be separate from the gateway 14 or may be distributed between the gateway 14 and another end-device.

An end-device 12 may connect to the gateway 100 and then be represented as a device to a non-ZigBee network (e.g., devices in an Ethernet network). This virtualization of the end-device 12 allows the end-device 12 to act as a wired device even though it is not connected via a wired interface. A non-ZigBee network device may be configured to send messages to the end-device 12 and the end-device 12 may be configured to reply to the non-ZigBee network device via a translation step in the gateway 100. For instance, the proprietary ICSP protocol may be translated in the gateway 100 for communication with non-ZigBee network devices (e.g., AMX equipment). It is to be understood that this virtualization may be extended to support any protocol.

Zigbee Network Registration

Referring now to FIG. 1, a block diagram illustrating an end-device request to join a ZigBee network message flow in accordance with an embodiment of the present invention is shown. An end-device 12 joins a ZigBee network by sending a request to join the ZigBee network message 16 to the Zigbee gateway 100. In response, the Zigbee gateway 100 sends a message 18 requesting device information. The end-device 12 then replies by sending relevant device information to the gateway 100. The device information may include, without limitation, the EUI of the end-device, port, channel, level and the like, of the end-device 12. After verifying the device information, the ZigBee gateway 100 sends a message 22 indicating that the end-device 12 has successfully joined the ZigBee network, at which time, a short address or Node ID is assigned to the end device and stored in the gateway 100. The short address is transmitted to the end device 12 in the message 22.

In the remainder of the description and for the purposes of clarity, the functions of the network coordinator and gateway are described independently, though they may be provided by a single device, such as the gateway 100 described above.

802.15.4/Zigbee Short Address Verification

Figure 2:
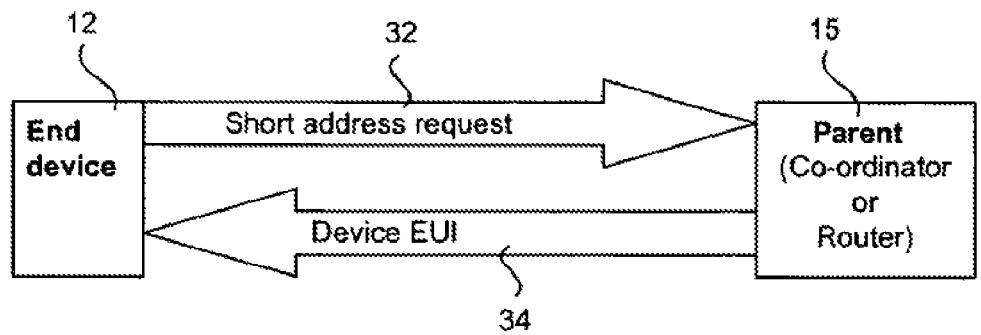
FIG. 2 is a block diagram illustrating an end-device short address check message flow in accordance with an embodiment of the present invention.

An end device short address may not be unique on a Zigbee network, which may give rise to device addressing conflicts. In order to address these conflicts, a device may periodically seek to verify its uniqueness on the network, or at least with respect to its parent. Referring now to FIG. 2, a block diagram illustrating an end-device short address check message flow between an end-device 12 and a parent node 15 in accordance with an embodiment of the present invention is shown. It is to be understood that the parent node 15 is typically either the network coordinator 14 or a router device 42. Periodically, an end-device 12, such as a mobile device, sends a short address request message 32 to its parent node 15 requesting the EUI of the short address that was assigned to the end-device 12 when it joined the ZigBee network. Upon a successful lookup by the parent 15, the EUI corresponding to the short address is sent to the end-device 12 via short address reply message 34. The parent node 15 may retrieve the EUI from a lookup table in its own memory. Alternatively, the parent node 15 may retrieve the EUI by requesting the EUI from a higher order parent node, eg. a router may retrieve the EUI from the network coordinator or the gateway.

Figure 9A:
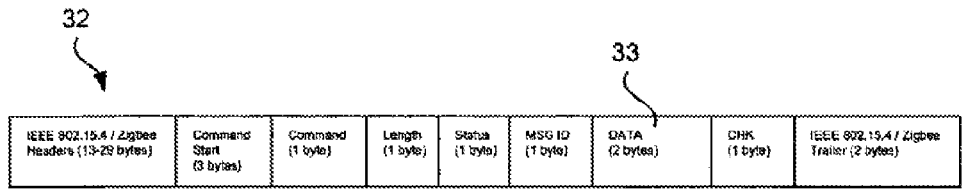
FIGS. 9A-9F are block diagrams illustrating exemplary ZigBee message formats in accordance with an embodiment of the present invention.
Figure 9B:
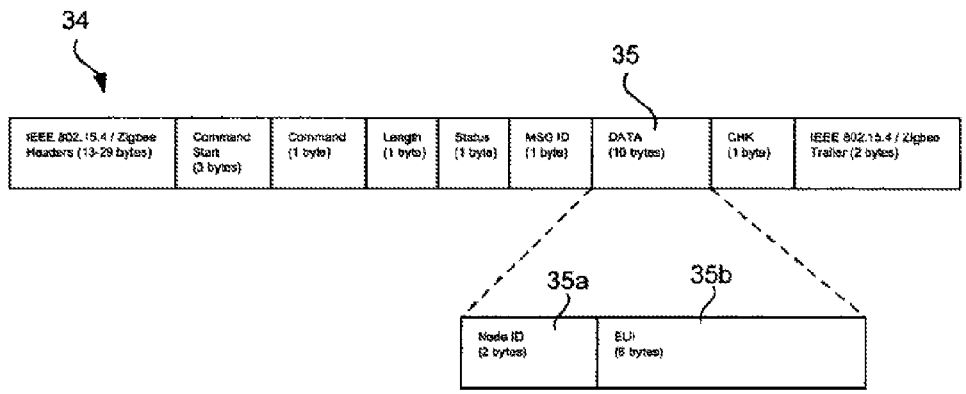

Referring now to FIGS. 9A and 9B, block diagrams illustrating exemplary ZigBee message formats in accordance with an embodiment of the present invention for the short address request message 32 and the short address reply message 34 are shown. According to these message formats, short address request message 32 includes a 2-byte data field 33 that contains the current node ID, ie short address, of the end-device 12. Reply message 34 includes a 10-byte data field 35 which is separated into a 2-byte node ID 35a for the end-device 12 and an 8-byte EUI 35b. Once the end-device 12 receives the EUI 35b corresponding to the short address from its parent 15, the received EUI 35b is compared against the current EUI of the end-device 12. If the EUIs match, the end-device 12 does nothing. If the retrieved EUI does not match the stored EUI, then the short address assigned to the end device is considered not unique on the Zigbee network, at least with respect to the parent node 15. The end-device 12 therefore performs a network connection routine to attempt to rejoin the network. During the network connection routine, the end device is assigned a new short address, which is associated with the EUI and stored in a lookup table on the Zigbee network. In performing the network connection routine, the end device 12 may connect through a second parent node.

If no EUI is sent from the parent 15 within a predefined period of time or a specified number of attempts, the end-device 12 may request a new parent 15. It is to be understood that the message formats for the short address request message 32 and the short address reply message 34 are provided for exemplary purposes and that other message formats are possible within the scope of the invention.

Figure 3:
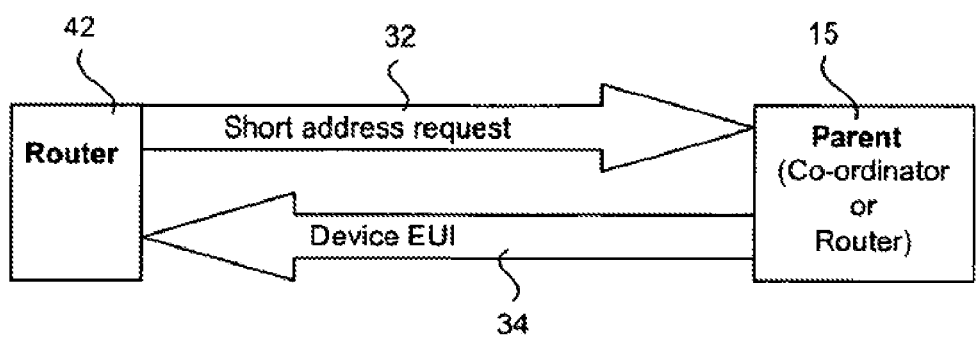
FIG. 3 is a block diagram illustrating a router device short address check message flow in accordance with an embodiment of the present invention.

Referring now to FIG. 3, a block diagram illustrating a router device short address check message flow in accordance with an embodiment of the present invention is shown. Similar to the processing of the end-device 12 described above with respect to FIG. 2, periodically, the router device 42 sends a short address request message 32 to its parent 15 requesting the EUI of the short address that was assigned to router device 42 when it joined the ZigBee network. Upon a successful lookup by the parent 15 the EUI corresponding to the short address is sent to the router device 42 via message 34. Once the router device 42 receives the EUI corresponding to the short address from its parent 15, the received EUI is compared against the current EUI of the router device 42. If the EUIs match, the router device 42 does nothing. If the EUIs are different, the router device 42 attempts to find a valid routing path. If no EUI is sent from the parent 15 within a predefined period of time or a specified number of attempts, the router device 42 attempts to find a valid routing path.

Periodic Heartbeat

Figure 4:
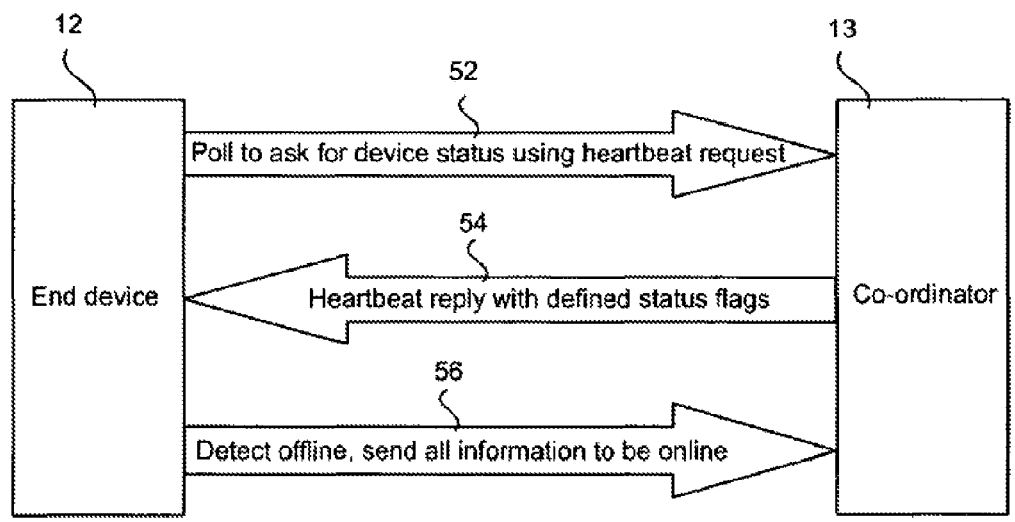
FIGS. 4 and 5 are block diagrams illustrating a periodic heartbeat message flow in accordance with an embodiment of the present invention.
Figure 5:
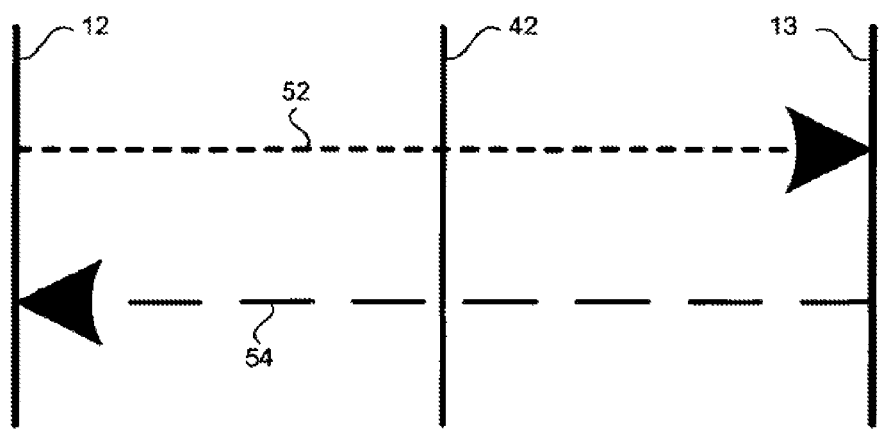

Referring now to FIGS. 4 and 5, block diagrams illustrating a periodic heartbeat message flow are shown. In order to make communications more efficient with a control system, a periodic heartbeat message 52 is utilized by an end-device 12 to poll a Zigbee gateway 14 for a status. Flags for network states (ZigBee network Present, Device Defined on Network, Master Controller Present, Online with Master, Firmware updates available) are mapped in a binary field as described in Table 1 below. The end-device 12 periodically sends a heartbeat message 52 requesting a current state to the ZigBee network coordinator 13. The coordinator 13 replies with a binary value containing the most current values for all the flags set via heartbeat reply message 54. If the heartbeat message 52 goes unanswered for a configurable period of time, the connection to the network is considered dead, and the end-device 12 performs a network connection routine to re-acquire the network connection. If the coordinator 13 does not receive a heartbeat message 52 from the end-device 12 within a configurable period of time, the end-device 12 is considered as dead, and the coordinator 13 clears the flags and stops routing traffic from any peripheral non-ZigBee network. In this situation, the coordinator 13 will not answer future heartbeat messages 52 from the end-device 12. This will force the end-device 12 to formally re-acquire a network connection, at which time the gateway 14 again will represent the end-device 12 to peripheral networks and continue operations as normal. The heartbeat message 52 may be configured to be sent at a different polling rate when the end-device 12 is awake, than when the end-device 12 is in a power save or sleep mode.

Figure 9C:
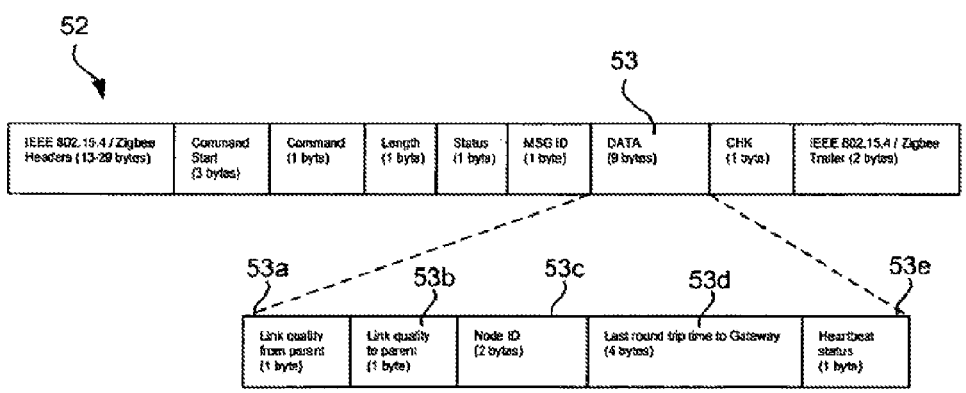
Figure 9D:
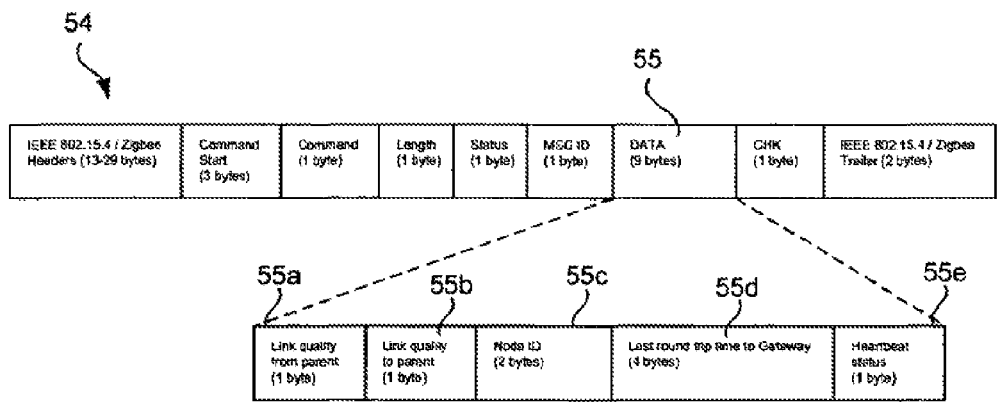

Referring now to FIGS. 9C and 9D, block diagrams illustrating exemplary ZigBee message formats in accordance with an embodiment of the present invention for the heartbeat message 52 and the heartbeat reply message 54 are shown. According to these message formats, heartbeat message 52 includes a 9-byte data field 53 which is separated into a 1-byte link quality from parent 53a, a 1-byte link quality to parent 53b, a 2-byte node ID 53c, a 4-byte last round-trip time to gateway 53d and a 1-byte heartbeat status 53e. Likewise, heartbeat reply message 54 includes a 9-byte data field 55 which is separated into a 1-byte link quality from parent 55a, a 1-byte link quality to parent 55b, a 2-byte node ID 55c, a 4-byte last round-trip time to gateway 55d and a 1-byte heartbeat status 55e.

The heartbeat status fields 53e and 55e contain multiple flags as defined in the Table 1:

TABLE 1

| BINARY VALUE | DESCRIPTION |
| --- | --- |
| 0X01 | ZIGBEE NETWORK PRESENT |
| 0X02 | DEVICE PREVIOUSLY DEFINED |
| 0X04 | MASTER CONTROLLER PRESENT |
| 0X08 | DEVICE REPRESENTED TO MASTER (ONLINE) |
| 0X10 | FIRMWARE UPDATE AVAILABLE |
| 0X20 | RESERVED (FUTURE USE) |
| 0X40 | RESERVED (FUTURE USE) |
| 0X80 | RESERVED (FUTURE USE) |

It is to be understood that the message formats for the heartbeat message 52 and the heartbeat reply message 54 are provided for exemplary purposes and that other message formats are possible within the scope of the invention.

Zigbee Gateway to Other Network Types

Figure 8:
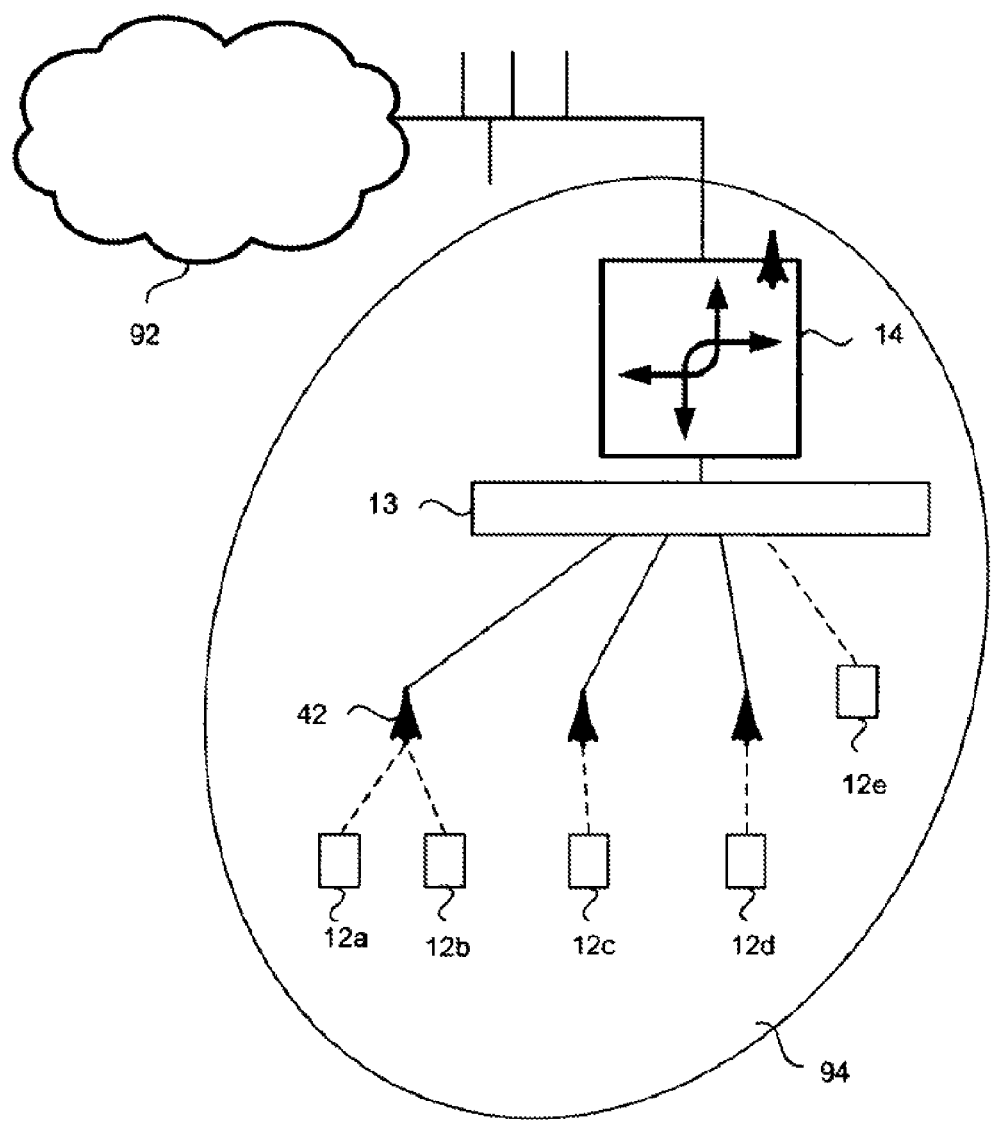
FIG. 8 is a block diagram illustrating a ZigBee gateway connecting a non-ZigBee external network to a ZigBee network in accordance with an embodiment of the present invention.

The ZigBee gateway 14 described herein is an aggregator of end-devices 12 and routers 42 in a ZigBee network, and a translator/bridge to non-ZigBee networks 92 or to devices in a non-ZigBee network 92. Non-ZigBee networks include, without limitation, Ethernet, Token Ring, wireless networks (such as GSM and CDMA networks), fiber optic networks and the like. Referring now to FIG. 8, a block diagram illustrating a ZigBee gateway 14 connecting a non-ZigBee network 92 to a ZigBee network 94 in accordance with an embodiment of the present invention is shown. Data from the non-ZigBee network 92 is routed to an appropriate end-device 12 within the ZigBee network, through the network coordinator 13 and any routers 42 required, and vice-versa. The gateway 14 may be configured to appear to the non-ZigBee network as a fully-functional and online end device with advertised services. That is, the gateway provides a virtual end device, representing other end devices to peripheral networks. In one possible configuration, messages bound for an end-device 12a-12e that do not require traffic to be sent to the actual end-device 12a-12e may be directly answered by the gateway 14 and/or network coordinator 13. For example, the gateway 14 or coordinator 13 may maintain the last-known status, eg online, offline, and advertised services for each end-device 12a-12e, and answer queries for that information from a device in a non-ZigBee network 92 without involving the actual end-device 12a-12e. This reduces the communication over the ZigBee network 94 and the usage of the airtime thereof. Further, when a non-ZigBee network 92 device that is communicably coupled to the gateway 14 sends a message to the gateway 14, the gateway 14 may be configured to provide appropriate device information to the requesting device without requiring the gateway 14 to directly interact with each end-device 12a-12e. For example, status requests from a peripheral network may be answered by the gateway, rather than being passed on to the end-device. Non-ZigBee network requesting devices include, without limitation, control masters (not shown). By having the gateway 14 respond to the status request messages without communicating with the end device, the ZigBee network does not get "flooded" with messages, thereby alleviating bandwidth and efficiency constraints within the ZigBee network. A further advantage of performing end device responses at the gateway is that an end device need not be unnecessarily woken from a sleep or power saving mode.

Zigbee Network Time Synchronization

The ZigBee network described herein may be configured to synchronize its timekeeping mechanism (e.g., real-time clock, operating system timer and the like) with a non-ZigBee network clock, such as the time from a network time protocol ("NTP"), a proprietary protocol including ICSP, and the like. In such a configuration, the gateway 14, or another Zigbee network device, may be configured to act as a time-synchronization agent for a ZigBee end-device 12 in communication with the gateway 14 by servicing any requests for the current time from that end-device 12, rather than transmitting the time request to the non-Zigbee network clock. Average latency through the ZigBee network may optionally be taken into consideration to provide a closer estimate. Two schemes may be employed according to the present invention to synchronize end-devices 12a-12e. First, the end-devices 12a-12e may be configured to periodically poll for the time. Second, the gateway 14 may be configured to notify each end-device 12a-12e at the next polltime (if in a polling network) for each of the respective end-devices 12a-12e or at the next available time-slot (in a non-polling network), servicing end-devices 12a-12e in a round-robin fashion, ie sequentially.

Figure 12:
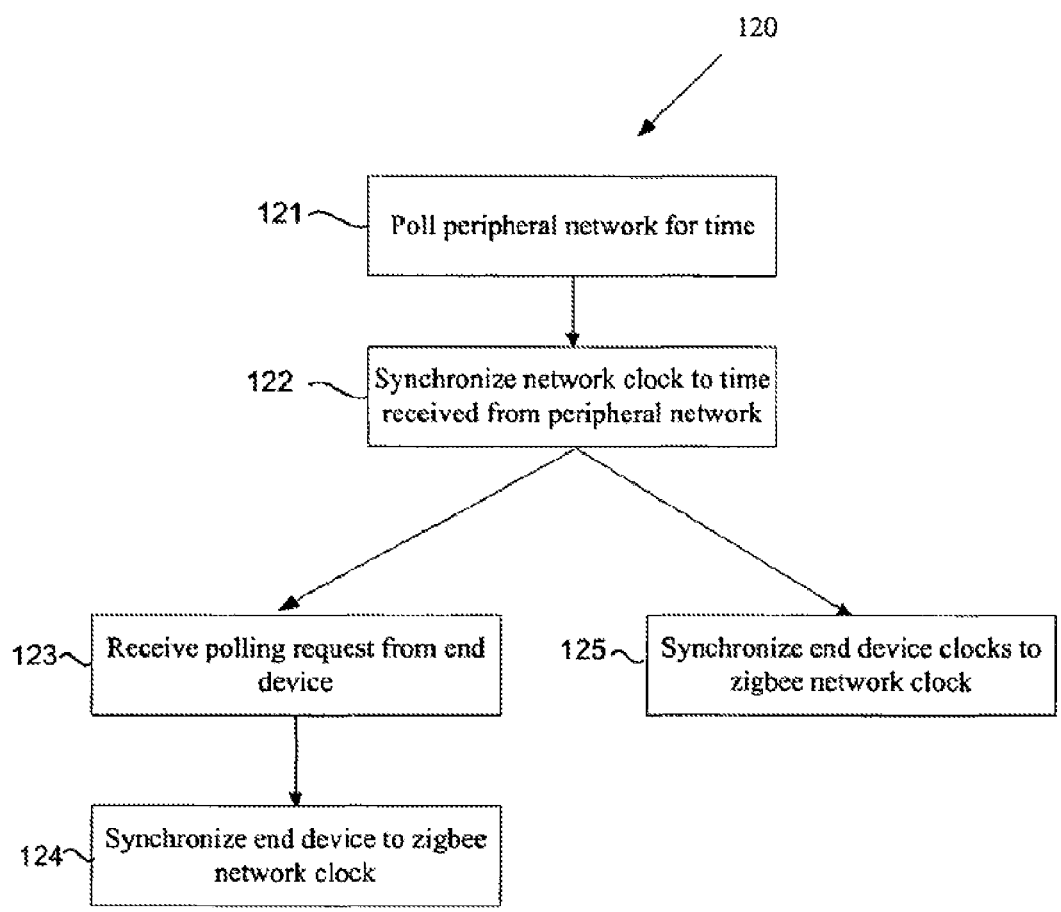
FIG. 12 represents a flow diagram for a network time synchronization process.

A message flow 120 for synchronizing the end devices is shown in FIG. 12. At step 121, the gateway polls a clock of a peripheral network for a time and then synchronizes the network clock to the peripheral network time at step 122. An end device may poll for the time at step 123 and by synchronized to the Zigbee network clock at step 124. Alternatively, the Zigbee network may sequentially synchronize the end device clocks to the Zigbee network clock without requiring a polling signal from the end device (step 125).

Whilst the gateway 14 has been described as acting as the time synchronization agent, the person skilled in the art will readily understand that other devices on the Zigbee network may similarly act as the time synchronization agent.

Zigbee Reliable Communication

When not using the ZigBee built-in application-level delivery confirmation, the sender (end-device 12, router device 42, coordinator 13 or gateway 14) may be configured to maintain a message to be sent in a queue when the first attempt to send is made. The message is associated with a maximum number of retries. If a MAC-level acknowledge is not received within a timeframe for the network (for example, with ZigBee, approximately 1.2 seconds per hop), the message is allowed to continue to exist in a retry queue. The retry queue may be implemented as a separate thread that runs periodically, and resends the message. When the message succeeds or the maximum number of retries is exhausted, for example 5 retries, the message may then be deleted and, optionally, network statistics may be updated to reflect the failure.

Figure 13:
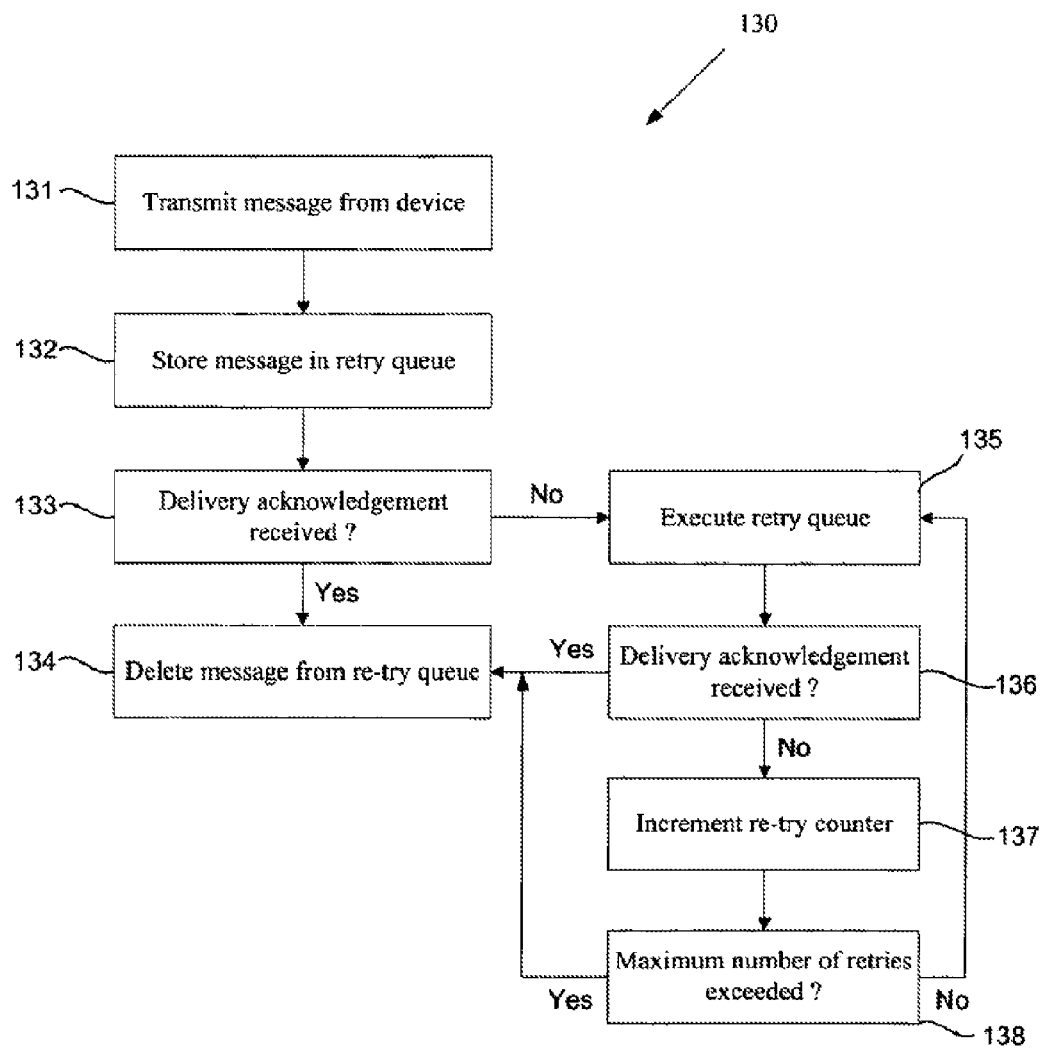
FIGS. 13 to 15 represent flow diagrams showing methods for enhancing reliable communication on a Zigbee network.

The flow diagram 130 of FIG. 13 shows one embodiment of a method for improving reliable communication on the Zigbee network. The flow diagram 130 is depicted as occurring within a processor 96 of a device operatively associated with a memory 97. The device may be any suitable device on the network having a transmitter, processor and memory, and can include end devices, routers, the coordinator or the gateway. At step 131, the processor 96 sends a message from the device. The processor stores the transmitted message in a re-try queue within the memory 97 (step 132) whilst awaiting receipt of a delivery acknowledgement message 133. If the delivery acknowledgement is received, the message is deleted from the retry queue 134.

The re-try queue can be set to execute at a predetermined period, or at an available time in the communication routines of the device. When the processor 96 executes the re-try queue, at step 135, the processor re-sends any messages in the queue and if a successful acknowledgement message (step 136) is received, the respective message is deleted from the re-try queue (step 134). If no delivery acknowledgement is received, eg, through timeout or an error message, the processor increments a re-try counter (step 137) for that message. The device then checks to see if a maximum number of re-tries has been exceeded (step 138), in which case, the message is deleted from the re-try queue. If the message is able to be resent, the message remains in the re-try queue awaiting the next iteration of the re-try queue.

Figure 14:
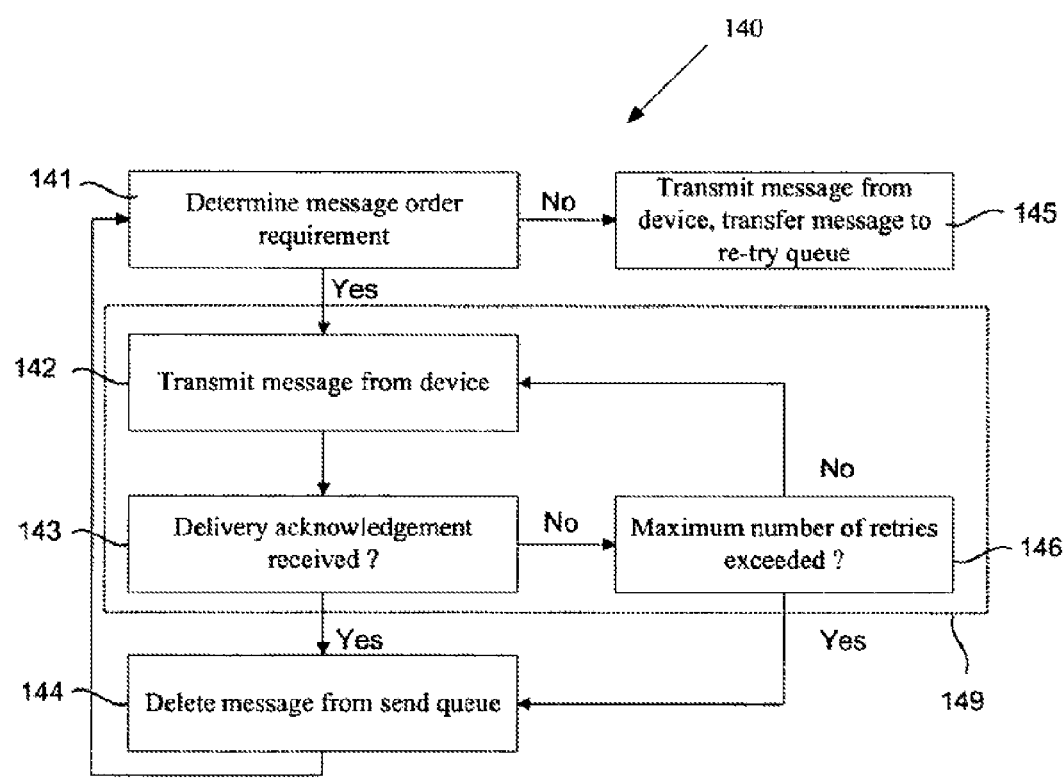

Certain protocols require messages in a specific order. To ensure reliable communication, the device may be configured to enforce that messages are sent in the original order. Under this configuration, until one message either succeeds or is dropped, other messages are held in a send queue. In one embodiment shown in FIG. 14 a message is processed, at step 141 to determine whether it has a message order requirement. If the message has no message order requirement, the message may be transmitted and transferred to the re-try queue 145 described above thereby allowing the next message to be sent. However, if the message is determined to have a message order requirement, the message is transmitted 142, and if no acknowledgement is received (step 143), the device loops 149 with the message at the head of the send queue. In each iteration of the loop 149, the device checks whether the maximum number of re-tries has been exceeded (step 146) before incrementing the re-try counter and re-transmitting the message (step 142). The device exits the loop 149 when either a successful acknowledgement message is received or the message has been re-transmitted a maximum number of times. The message is deleted from the send queue (step 144) and the device returns to step 141 to process the next message.

When a message having a message order requirement is deleted from the send queue because it cannot be successfully transmitted, it may become unnecessary to transmit any ensuing messages that are related to the unsuccessful message, for example, sequential messages executing a specified protocol. In this case, the related messages may also be deleted from the send queue.

Figure 15:
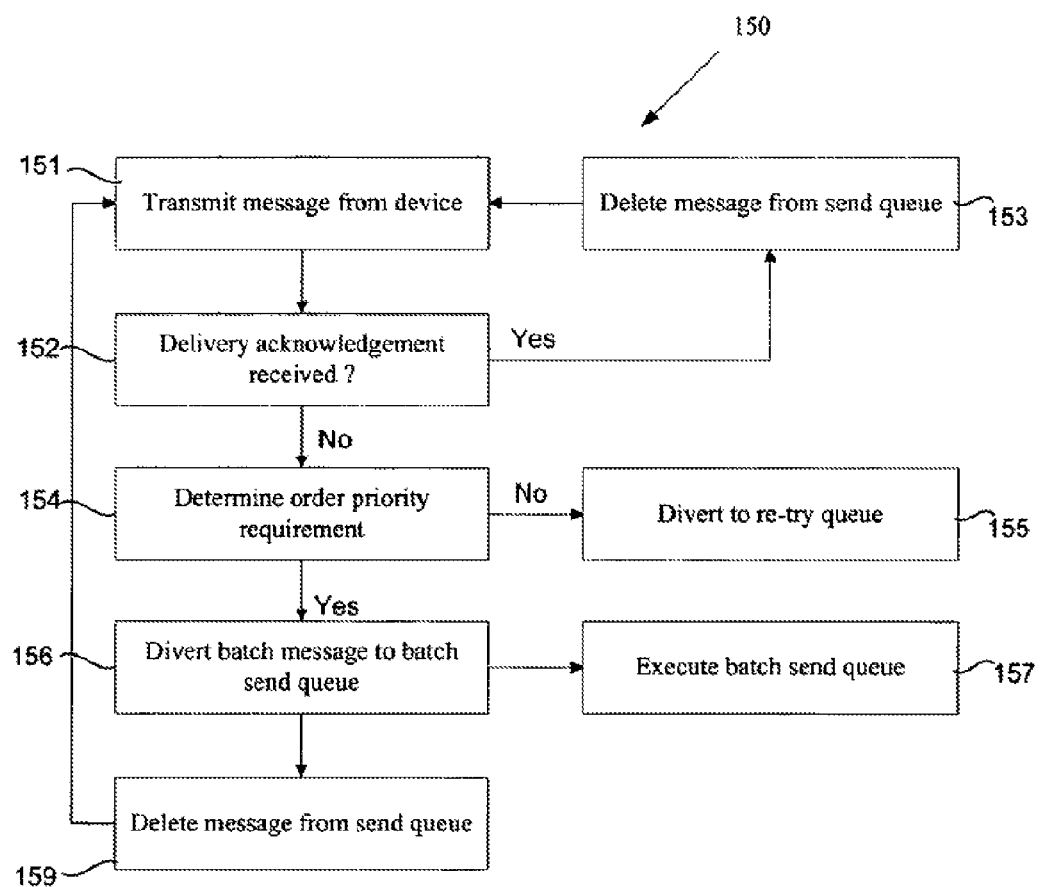

In an alternative embodiment, messages having a related message order requirement, eg messages forming part of a protocol, may be batched to ensure correct order transmission and reliable communication on the network. In FIG. 15, a message flow 150 commences by transmitting the lead message in a send queue. Messages that are successfully sent 152 are deleted from the send queue 153 and then the next message is transmitted. If the message is not successfully sent and has no message order requirement 154, the message may be transferred to a re-try queue 155 as described previously so that attempts to re-send the message can be made when the re-try queue executes. If the unsuccessful message does have a message order requirement, the message is transferred to a batch re-send queue 156 together with any following messages from the batch. The batch re-send queue may execute 157 using the loop 149 described with respect to FIG. 14, to ensure that the messages from the batch are sent in correct order. That is, each message in the batch is transmitted and re-transmitted until successful or a maximum number of re-tries has been attempted. An advantage of this embodiment is that because the loop only executes on the batch re-send queue, messages in the send queue that are not part of the batch may be sent without being delayed by attempts to re-send the batch messages. The batch re-try queue is described herein as being separate to the re-try queue for the purposes of the example. However, the skilled addressee will readily understand that the two queues may be combined with additional loop processing for messages having a message order requirement.

Zigbee Gateway Quick Reconnect on Wake

One or more of the end-devices 12 may be configured to periodically operate in a power saving mode to save power. A power saving mode may be, for example, a sleep mode or a reduced functionality mode. It is possible that a non-ZigBee network device may attempt to interact with an end-device 12 while it is in a power saving mode. In some situations, it may be desirable to not wake the end-device 12 while in other situations, it may be desirable to wake the end-device 12. In order to support end-device states such as "online" and "offline," the gateway 14 may be configured to identify a sleeping end-device 12 as "offline" in status queries from the non-ZigBee network. Additionally, the gateway 14 maintains at least some of the last reported device information from the end-device 12. The end-device 12 may be configured to report such device information periodically, for example as the periodic heartbeat messages 52 described above (FIG. 7), and at the time it enters a power saving mode to ensure that the most current device information is maintained in the coordinator 13 and/or gateway 14. The last reported device information from the end-device may also be used to support fast reconnection times when an end-device 12 wakes up. Optionally, the gateway 14 may be configured to interact with the non-ZigBee network on behalf of the end-device 12, as described above, for some or all of the message communication. As such, it is possible that the non-ZigBee network may believe that it is interacting with an end-device 12 when, in fact, the end-device 12 is in a power save or sleep mode. In particular, the non-ZigBee network may never be aware that the end-device 12 was or is in a power save or sleep mode. In one embodiment, messages that are required to be sent to the end device 12 whilst the end device is in a power saving mode are cached in the gateway memory and transmitted to the end device 12 upon receipt of the wake notification from the end device.

Figure 6:
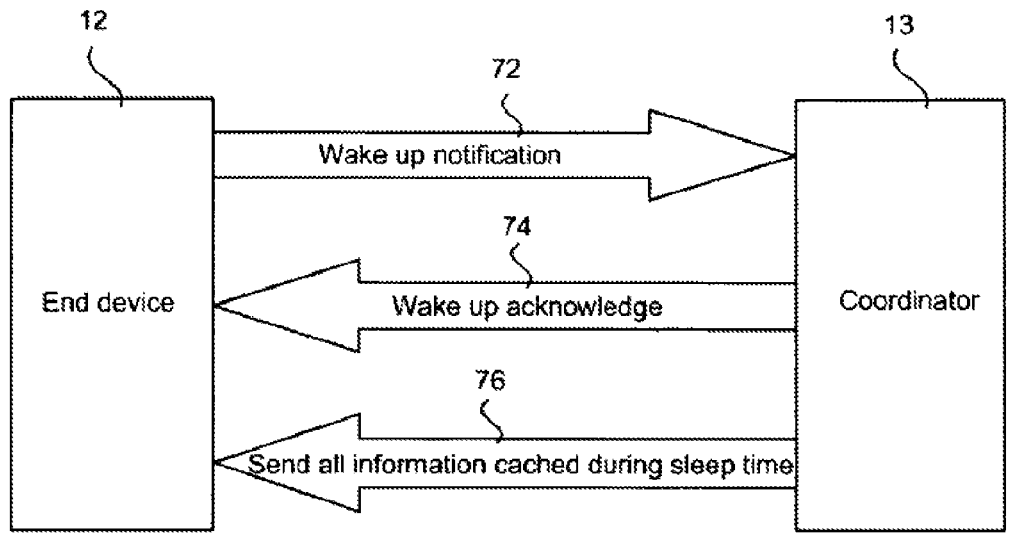
FIGS. 6 and 7 are block diagram illustrating a wake up notification message flow in accordance with an embodiment of the present invention.
Figure 7:
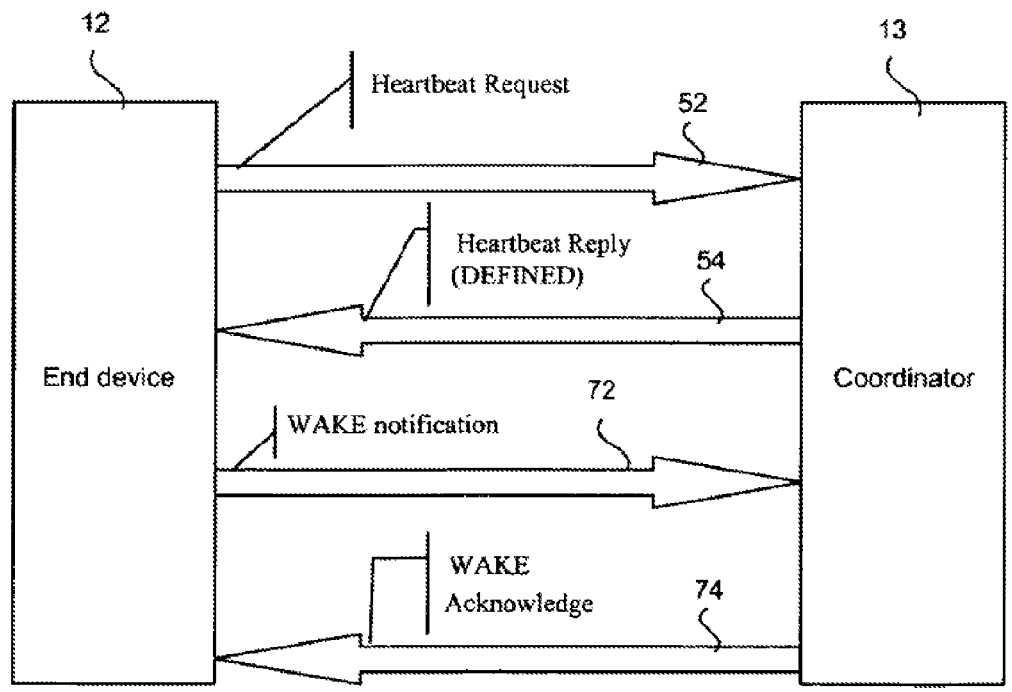

Referring now to FIGS. 6 and 7, block diagrams illustrating a wake up notification message flow in accordance with an embodiment of the present invention are shown. When a sleeping end-device 12 exits power save or sleep mode and enters an online state, the end-device 12 sends a wake notification message 72 to the coordinator 13. In response, the coordinator 13 sends a wake acknowledgement message 74.

Figure 9E:
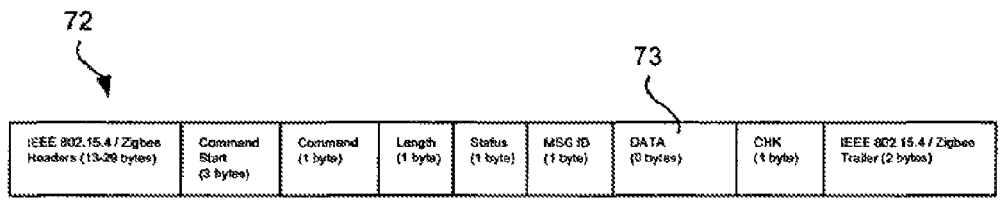
Figure 9F:
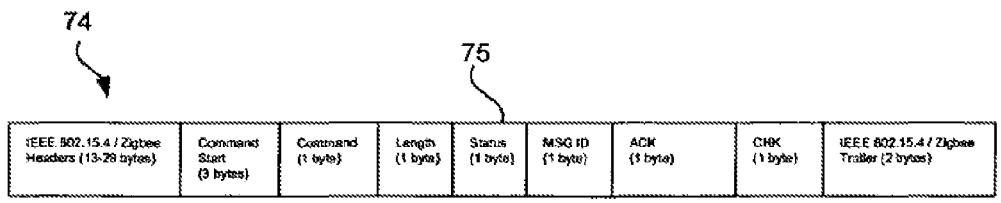

Referring now to FIGS. 9E and 9F, block diagrams illustrating exemplary ZigBee message formats in accordance with an embodiment of the present invention for the wake notification message 72 and the wake acknowledgement message 74 are shown. According to these message formats, no data is required in the data byte 73 of the wake notification message 72. Wake acknowledgement message 74 includes a 1-byte binary status field 75 which contains multiple flags, as defined in the Table 1 above. Upon receipt of the wake acknowledgement message 74, end-device 12 evaluates the "defined" flag portion of the status field 35, as defined in Table 1 above. If the "defined" flag is not set, then the end-device 12 may be required to formally re-acquire the connection as previously discussed. The coordinator 13 may be configured to automatically mark the end-device 12 as "online" upon receipt of the wake notification message 72. If this is the case, if the "defined" flag is set, then the end-device 12 may possibly do nothing. Otherwise, the end-device 12 may optionally be required to send an additional message to the coordinator 13 in order to inform the coordinator 13 that the end-device 12 is exiting the power save mode and entering an online mode. In either case, upon notification that the end-device 12 is exiting power save mode and entering an online mode, the gateway may be configured to inform the non-ZigBee network of the updated status of the end-device 12. The gateway 14 and/or coordinator 13 may also resend cached device information to the end-device 12 via message 76, if necessary. The cached device information may include any messages that were received by the gateway from the non-Zigbee network whilst the end device 12 was in sleep mode. It is to be understood that the message formats for the wake notification message 72 and the wake acknowledgement message 74 are provided for exemplary purposes and that other message formats are possible within the scope of the invention.

Zigbee Network to Zigbee Network Roaming

Figure 16:
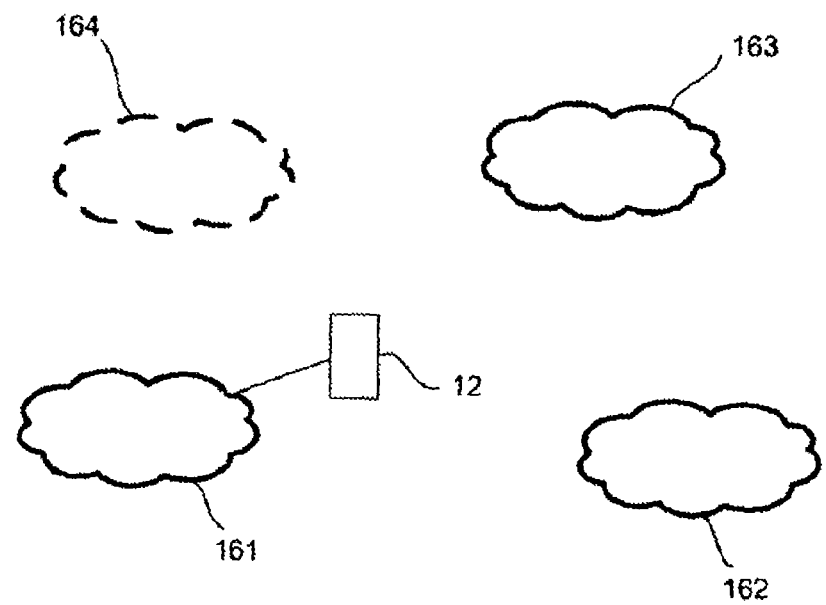
FIGS. 16 to 19 show network connections for a device roaming on a Zigbee network.

The ZigBee supports roaming of a mobile end-device 12 between coordinators 14 and routers within a single ZigBee network. However, ZigBee does not provide a method of roaming from one ZigBee network to another ZigBee network. In an embodiment of the present disclosure, this deficiency is addressed in ZigBee by providing roaming capability. FIG. 16 shows an end-device 12 located in a network space having multiple Zigbee networks 161, 162, 163, 164. The end device 12 is configured to determine a list of ZigBee networks it is interested or authorized to join. The list may be configured either on the end-device 12 itself, or sent from another device utilizing the ZigBee gateway 14. Such devices may include end-devices 12 or non-ZigBee network devices.

Figure 17:
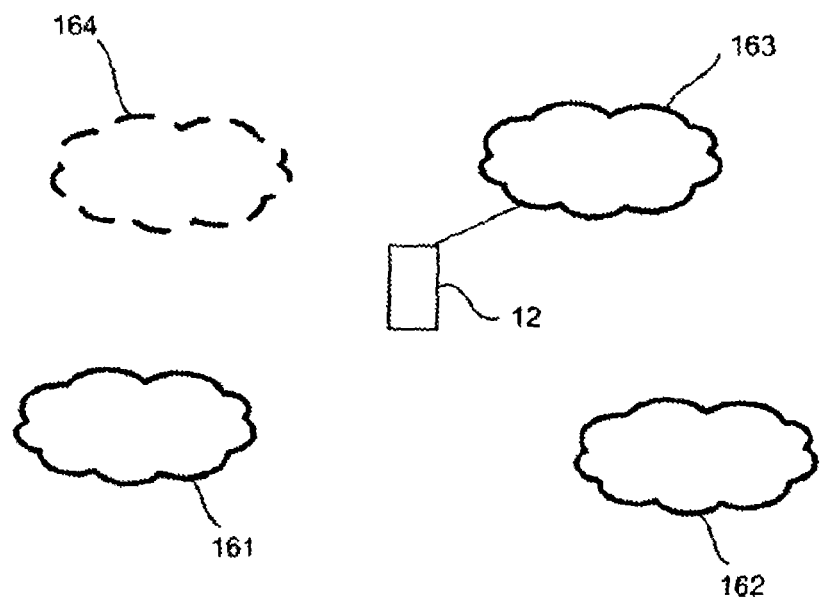

As shown in FIG. 16 the end device 12 is initially connected to network 161. The end device is portable, and in FIG. 17, has roamed out of the network space of network 161. When the current connection quality from the end device 12 to the network 161 falls below a user-defined minimum threshold, the end device 12 scans the network space for beacons representing available, joinable ZigBee networks. The end device identifies beacons, and associated network identities, for each of the available networks 162, 163, 164. The beacons and their network identities allow the end device to determine which of the available networks is provided within the stored list of networks that the end device is able to join. For example, the end device may determine that network 164, shown in ghosted outline, is unavailable for joining. Networks 162, 163 are therefore available for joining, and the device selects one of these eg network 163 and undertakes the remaining connection procedure with that network.

Figure 18:
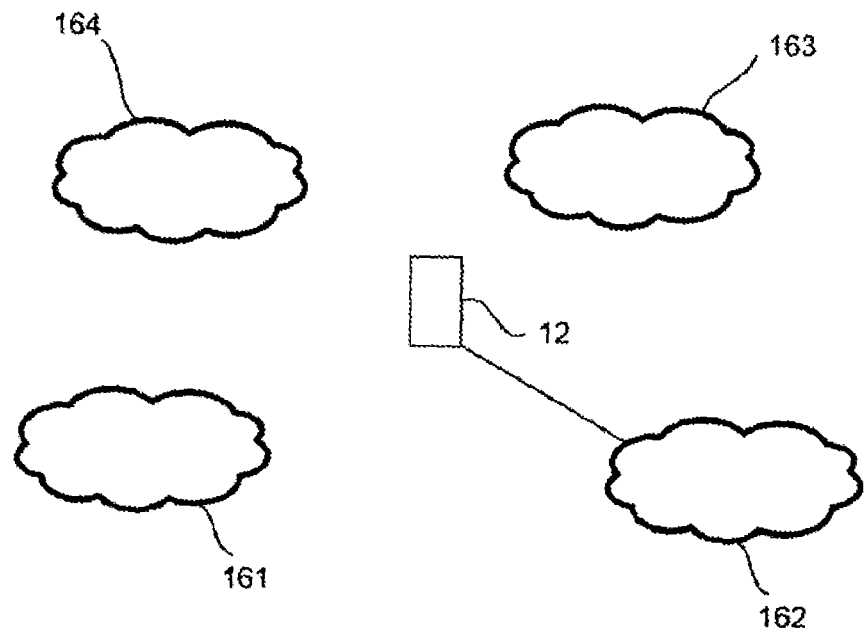

In one embodiment, the available, joinable ZigBee networks are ordered by connection quality, and the ZigBee network with the best connection quality is automatically selected and joined by the mobile end-device 12. The connection quality may be measured by bit error rate or by some other quality assessment such as a received signal strength indication. For example, in FIG. 18, the end device 12, having disconnected from network 161 evaluates the airspace as having networks 162, 163, 164 that are each within the list of joinable networks and are presently available to the end device 12. Network 162 is determined as having the highest connection quality, and so end device 12 connects to network 162.

Figure 19:
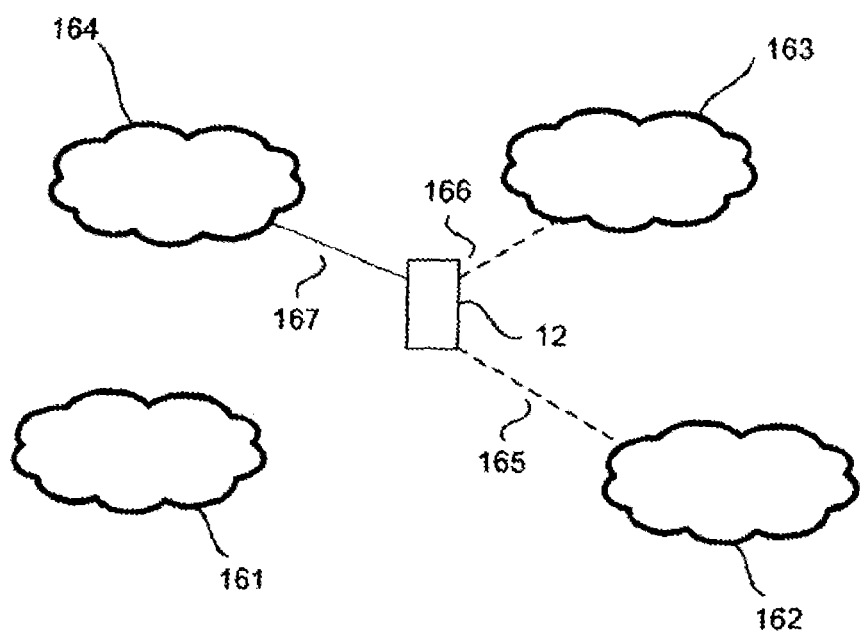

In one embodiment, the list of joinable networks maintained by the end device includes a preference rank. The end device selects the most preferred network, eg the highest ranked network, with a connection quality above a defined threshold. For example, in FIG. 19, the end device 12, having disconnected from network 161 evaluates the airspace as having networks 162, 163, 164 that each meet the minimum connection quality threshold as indicated by connections 165, 166 and 167. Out of these three networks, the network 164 has the highest preference ranking, and therefore the end device selects the connection 167.

In one embodiment, the end device may be configured to periodically seek a more preferred network, eg as determined by connection quality or network rank, irrespective of whether the current network connection has fallen below a minimum connection quality.

Figure 20:
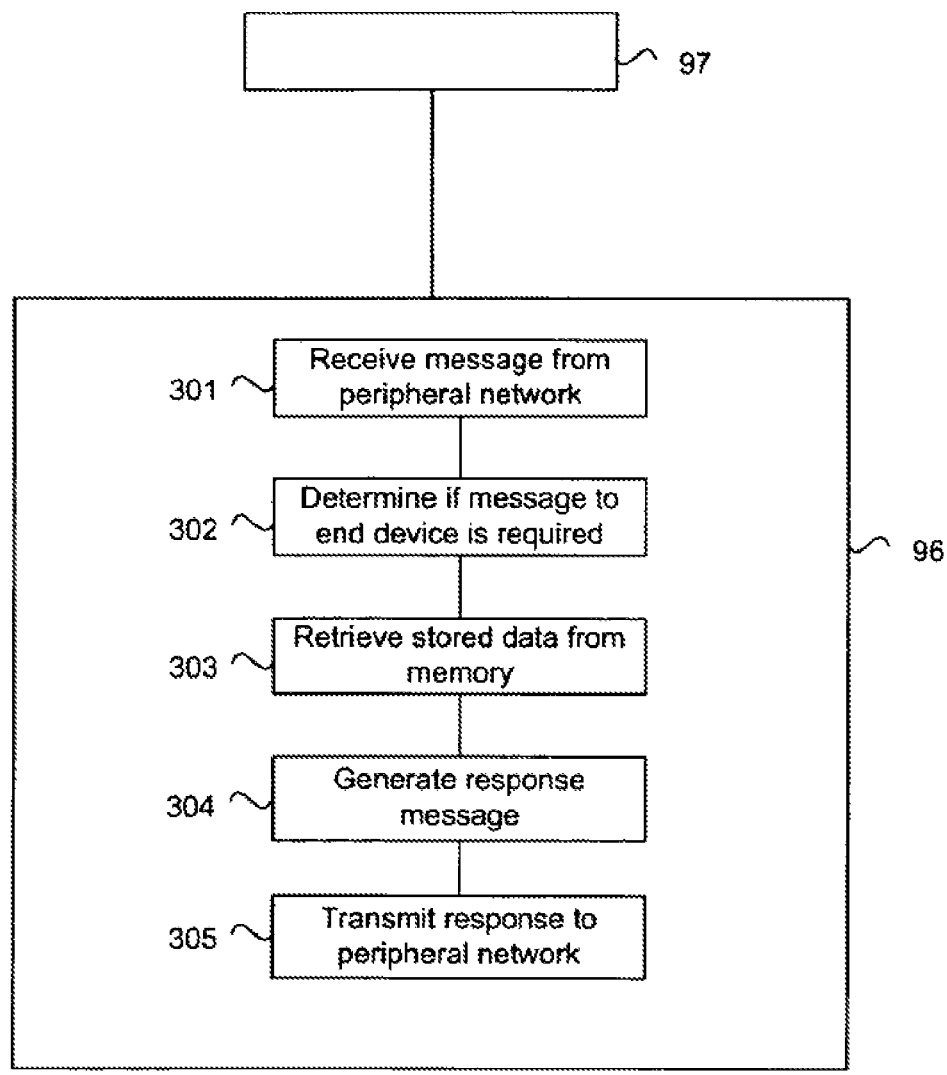
FIG. 20 shows a processor and memory in accordance with an embodiment of the present invention.

As shown in FIG. 20, a processor 97 and a memory 96 are communicably coupled. The memory 96 includes instructions that when read by the processor 97 allow the processor to: receive message from peripheral network 301, determine if message to end device is required (302), retrieve stored data from memory 303, generate response message 304, and transmit response to peripheral network 305.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient.

What is claimed is:

1. A method, comprising:
   determining that a message that was transmitted from a first queue of a device has not been received;
   re-transmitting the message and transmitting one or more subsequent messages associated therewith in a batch in a particular order from a re-try queue that is different from the first queue,
   wherein each batch message is repeatedly transmitted until at least one of a maximum number of re-tries is reached and an acknowledgment message is received, and when the maximum number of re-tries is reached or the acknowledgment message is received, deleting the respective batch message from the re-try queue.

2. The method according to claim 1 wherein when the message was not successfully transmitted, determining when the message can be re-transmitted.

3. The method according to claim 2 further comprising determining whether the message can be re-transmitted by determining whether a maximum number of re-tries requirement has been met.

4. The method according to claim 1 wherein the step of re-transmitting the message further comprises incrementing a re-try counter.

5. The method according to claim 4 wherein the step of re-transmitting the message comprises executing the re-try queue.

6. The method according to claim 4 wherein the re-try queue is executed periodically.

7. The method according to claim 4 wherein each of a plurality of messages in the batch are transmitted from the re-try queue sequentially.

8. The method according to claim 1 further comprising re-transmitting the message and transmitting all subsequent messages in the batch until the batch of messages is successfully transmitted.

9. The method according to claim 1 further comprising determining whether the message was successfully transmitted.

10. The method according to claim 1 further comprising storing the message and the one or more subsequent messages in the batch with a message order requirement in the re-try queue.

11. The method according to claim 1 further comprising executing the re-try queue.

12. A device, comprising:
a transmitter;
a processor electrically connected to the transmitter; and
a memory electrically connected to the processor;
wherein the processor determines that a message that was transmitted from a first queue of the device has not been received;
wherein the transmitter re-transmits the message and one or more subsequent messages associated therewith in a batch in a particular order from a re-try queue that is different from the first queue,
wherein each batch message is repeatedly transmitted until at least one of a maximum number of re-tries is reached and an acknowledgment message is received, and the processor is configured to delete the respective batch message from the re-try queue when the processor determines that the maximum number of re-tries is reached or the acknowledgment message is received.

13. The device according to claim 12 wherein, when the message was not transmitted successfully, the processor determines when the message can be re-transmitted.

14. The device according to claim 13 further comprising a counter, wherein the processor determines whether the message can be re-transmitted using said counter.

15. The device according to claim 12 wherein the processor increments the counter when the message is re-transmitted.

16. The device according to claim 12, wherein the transmitter re-transmits the message and all subsequent messages in the batch until the batch of messages is successfully transmitted.

17. The device according to 15 wherein the processor is configured to execute the re-try queue periodically.

18. The device according to claim 15 wherein the processor is configured to execute the re-try queue by causing messages in the re-try queue to be re-transmitted sequentially.

19. The device according to claim 12, wherein the processor determines whether the message was transmitted successfully.

20. A non-transitory computer-readable storage device comprising computer-executable instructions for execution by at least one processor that, when executed, cause the at least one processor to perform:
determining that a message that was transmitted from a first queue of a device has not been received;
re-transmitting the message and transmitting one or more subsequent messages associated therewith in a batch in a particular order from a re-try queue that is different from the first queue,
wherein each batch message is repeatedly transmitted until at least one of a maximum number of re-tries is reached and an acknowledgment message is received, and when the maximum number of re-tries is reached or the acknowledgment message is received, deleting the respective batch message from the re-try queue.

* * * * *